Feb. 1, 1944. A. A. WEGNER 2,340,783
PIVOTED FLIGHT CONVEYER
Filed Sept. 29, 1941
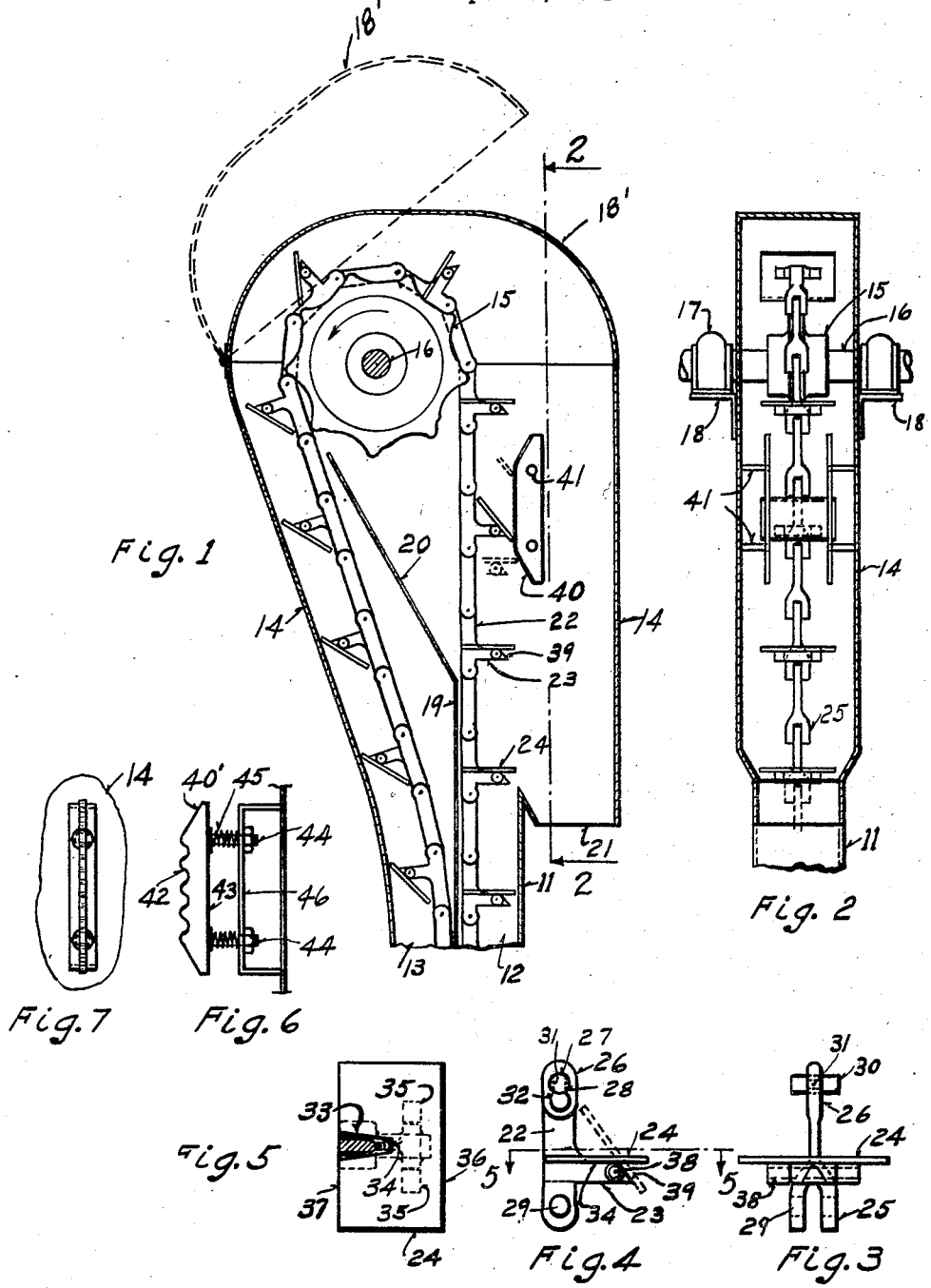
Arnold A. Wegner
INVENTOR.
BY George A. Evans
ATTORNEY.

Patented Feb. 1, 1944

2,340,783

UNITED STATES PATENT OFFICE 2,340,783

PIVOTED FLIGHT CONVEYER

Arnold A. Wegner, Wauwatosa, Wis., assignor to Chain Belt Company, Milwaukee, Wis., a corporation of Wisconsin Application September 29, 1941, Serial No. 412,759

3 Claims. (Cl. 198—170)

This invention relates to a conveyer, and more particularly to a conveyer having pivoted flights attached to an endless chain, the latter being disposed to propel materials in bulk through a closed conduit to a suitable point of discharge.

It is an object of the present invention to provide in such a conveyer a new and unique method of pivotal securement between the chain and its flights whereby the desired position of the flights may be effectively controlled during the operating portion of the conveyer's run and whereby the flights may be tilted adjacent the discharge outlet of the conduit to cause complete removal of material from the top surface of the flights.

Another object of the invention is to provide an improved tripping device for conveyers of the class described whereby the flights may be maintained in tilted position for discharge and while so positioned may be vibrated to remove material which may be of a sticky or coalescent nature.

With these general objects in view and such others as may hereinafter appear, the invention resides in a conveyer and in the various elements, arrangements and combinations of elements described herein and defined in the appended claims.

In the drawing illustrating preferred embodiments of the invention,

Figure 1 is a side elevation of the head portion of a conveyer in which the material is transported in a vertical direction;

Figure 2 is a section taken on the line 2—2 of Figure 1;

Figure 3 is a front view of a chain link illustrating the attachment between the chain and the flight;

Figure 4 is a side elevation of the link shown in Figure 3;

Figure 5 is a section taken on the line 5—5 of Figure 4;

Figure 6 is a side elevation of a modified form of tripping device; and

Figure 7 is a front view of the device shown in Figure 6.

Referring to the drawing and particularly to Figure 1, there is shown a casing 11 housing vertical leg portions 12 and 13, the former enclosing the material propelling means during its active or conveying run while the latter confines it during its return or empty run. Superimposed above casing 11 is the head section 14 of the elevator which is really a continuation of the latter, but is preferably widened as shown in Figure 2 to facilitate discharge of the conveyer.

Head portion 14 is also of increased depth in order to accommodate head sprocket 15 disposed in the upper portion of the casing, said sprocket being keyed to a shaft 16 mounted in bearings 17 supported by brackets 18 mounted on the outside of the casing. Disposed above sprocket 15 is a hinged cover 18$^1$ permitting inspection as well as adjustment of the conveyer elements.

Separating the active and return runs of the conveyer is a vertical partition 19, which is bent at an inclined angle as at 20 beneath the sprocket to gather material which may cling to the draft mechanism even after its intended discharge. The point of inflection of this inclined deck 20 is slightly above discharge outlet 21 disposed in the forward wall of the casing.

The lower portion of the conveyer or elevator casing is not shown in the drawing, since any of a number of well known shapes of casing may be employed. It should be sufficient to point out that the casing is laid out in a closed path with a feed inlet disposed in a suitable position for receiving the material, and in general the contour of the conveying conduits will be similar to that illustrated by leg portions 12 and 13 just below where they communicate with the head section.

For propelling material through the active leg 12 of the casing, I employ an endless chain 22 arranged to lie against the inner wall of the partition casing as indicated by its contact with partition 19. Extending forwardly a major portion of the distance from the inner wall to the outer wall of the casings are link attachments or arms 23, said arms being provided either on consecutive links or on alternate or spaced links, as illustrated herein. Flights 24 are pivotally attached near the extremities of the forwardly extending arms 23, said flights being so shaped that the outer peripheries thereof occupy substantially the entire cross section of the enclosing casing when the flights are at right angles to the chain and the casing.

The chain itself is composed of links which, when viewed from the front, as in Figures 2 and 3, are Y shaped with the leg portions 25 separated a sufficient distance to accommodate the shank portion 26 of an adjacent link when the links are in hinged relationship. For ease in assembling and disassembling, the shank end of the link is provided with a keyhole slot 27, the straight portion 28 of which is aligned with circular apertures 29 in the legs 25 of the connected link. Pin 30, which is illustrated in Figure 3, has a flat intermediate portion or groove 31 of approximately the same width as that of the shank end of the link, and when the chain is under tension the pin has a dead bearing in the center and a live bearing in the two outer apertures. To remove the pins 30 adjacent links may be pivoted at right angles and the shank end of one link moved sufficiently so that the pin may register with the circular portion 32 of the keyhole slot.

Flights 24 are preferably made of flat metal plates and are notched on their inner side to accommodate the chain and permit pivoting of the flights with respect to the chain links. This notched portion designated 33 is disposed so that the bottom 34 of the notch contacts arm 23, thereby supporting the link in a horizontal position during vertical runs of the conveyer. To pivotally attach the flights to the arms, a pair of ears 35 are provided depending from the lower side of each flight at a point somewhat closer to the outer side 36 of the flight than to the inner side 37. The ears are intended to cooperate with a transversely disposed aperture in arm 23, these members being retained in hinged relation by pin 38. To limit pivoting of the flights away from the supporting arms 23, arms 23 extend slightly beyond the pivot points and are provided with a tapered surface 39 disposed to abut the underside of the flights when the latter have been tilted to a suitable angle for discharge.

While the position of the pivot point may be varied within certain limits, it is important that it be placed as far from the chain as possible to afford support for the flights while they are propelling material through the various runs of the conveyer casing. In the drawing I have indicated this position as approximately two-thirds of the distance from the back to the forward wall of the casing, this apportionment of distance being one which insures good support for the flights while providing adequate clearance for the tilting of the flights in the manner as hereinafter described.

While the major portion of the material reaching the discharge outlet will flow by gravity from the space between flights, it is important that the top surface of the flights be clean, especially where the material being handled is of a sticky or coalescent nature and tends to build up on top of the flights. To effect this cleaning there is provided adjacent the outlet a stationary cam or tripping device 40, the latter being so arranged that it may engage that portion of the flights which extend beyond arms 23, thereby causing the flights in passing to tilt into a suitable discharge position. While in the drawing I have illustrated two such cams supported on rods 41 mounted on the side of the casing, it will be clear that instead of two cams contacting each flight, one cam may be employed disposed medially of the flight. Whichever arrangement is used, it is desirable that the cams have a narrow contacting face to afford a minimum of restriction to the flow of material off the flights.

One of the principal advantages of the present invention is the fact that the discharge outlet is not limited in its position to any particular locus. While I have illustrated the outlet as being only a short distance below the head sprocket, it may be considerably lower, and since the tripping device is disposed outside the chain, i. e., outside the closed path of its travel, the tripper may easily be installed at different elevations without requiring changes in the casing construction.

In Figure 6 there is shown a modified form of tripping device in which the camming surface instead of being straight is serrated or notched as at 42. This design effects vibration of the flights while in tilted position and where particularly sticky material is encountered, such shaking action helps to clean the flights. The method of mounting cam $40^1$ shown in Figure 6 is also slightly modified; for in this form the back surface 43 of the cam plate is welded or otherwise secured to one or more studs 44 and yieldably tensioned by means of springs 45 against a supporting bracket 46 through which the studs extend. This resilient method of mounting the cam permits lateral or transverse motion of the chain opposite the cam, such as may be caused by chordal action of the links when they come into sprocket contact. This flexibility in conjunction with the fact that the chain is not rigidly supported by the casing partition 19 while it is opposite the cam is a factor in promoting proper chain and sprocket action.

After the flights have traveled over the head sprocket they may pivot away from the link-supporting arms, but the pivoting motion is arrested by abutment 39 and the amount of pivoting is not so great but that when material is encountered in the inlet opening, the flights will straighten out under pressure from the material and assume the carrying position illustrated in the drawing.

Since various modifications may be made in the different embodiments of the invention disclosed herein, the invention is not intended to be limited to the precise details of this description but is intended to be given a scope commensurate with the following claims.

I claim:

1. In a conveyer for propelling material in bulk through a closed conduit, a casing having substantially enclosed, material-confining walls and an opening for discharge, an endless chain arranged to move longitudinally through said casing, said chain including links, each link having an arm intermediate the ends thereof and extending a major portion of the distance across said casing, a flight pivotedly supported on said arm and having an overhanging portion extending beyond said arm, said flight being disposed to occupy substantially the entire cross section of the casing when at right angles to the chain and having a slotted portion to accommodate the chain when the flight is in said last named position, and cam means arranged to engage the overhanging portion of said flight as it passes the discharge opening to cause tilting movement thereof, said cam means being yieldably mounted with respect to the flight to cushion the impact therewith.

2. In a conveyer for propelling material in bulk through a closed conduit, a casing having substantially enclosed, material-confining walls and an opening for discharge, an endless chain arranged to move longitudinally through said casing, said chain including links, each link having an arm intermediate the ends thereof and extending a major portion of the distance across said casing, a flight pivotedly supported on said arm and having an overhanging portion extending beyond said arm, said flight being disposed to occupy substantially the entire cross section of the casing when at right angles to the chain and having a slotted portion to accommodate the chain when the flight is in said last named position, and cam means arranged to engage the overhanging portion of said flight as it passes the discharge opening to cause tilting movement thereof, said cam means being yieldably mounted with respect to the flight to cushion the impact therewith and having a serrated face for vibrating the flight when in tilted position.

3. In a conveyer for propelling material in bulk through a closed conduit, a casing having substantially enclosed, material-confining walls and an opening for discharge, an endless chain arranged to move longitudinally through said casing, said chain including links, each link having an arm intermediate the ends thereof and extending a major portion of the distance across said casing, a flight pivotedly supported on said arm and having an overhanging portion extending beyond said arm, said flight being disposed to occupy substantially the entire cross section of the casing when at right angles to the chain and having a slotted portion to accommodate the chain when the flight is in said last named position, yieldably mounted cam means arranged to engage the overhanging portion of said flight as it passes the discharge opening to cause tilting movement thereof, and an inclined receiving chute disposed on the opposite side of the chain from the cam, said receiving chute being spaced from the chain in the region of cam contact.

ARNOLD A. WEGNER.